US012052244B2

(12) United States Patent
Manjunatha et al.

(10) Patent No.: US 12,052,244 B2
(45) Date of Patent: Jul. 30, 2024

(54) SYSTEMS AND METHODS FOR SECURE AND PRIVACY PRESERVING DEVICE CLASSIFICATION

(71) Applicant: GOOGLE LLC, Mountain view, CA (US)

(72) Inventors: Mahesh Keralapura Manjunatha, Mountain View, CA (US); Chiu Wah So, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 595 days.

(21) Appl. No.: 17/261,834

(22) PCT Filed: Apr. 3, 2020

(86) PCT No.: PCT/US2020/026621
§ 371 (c)(1),
(2) Date: Jan. 20, 2021

(87) PCT Pub. No.: WO2021/201880
PCT Pub. Date: Oct. 7, 2021

(65) Prior Publication Data
US 2022/0109672 A1  Apr. 7, 2022

(51) Int. Cl.
G06F 21/00 (2013.01)
G06F 16/23 (2019.01)
(Continued)

(52) U.S. Cl.
CPC ...... *H04L 63/0876* (2013.01); *G06F 16/2379* (2019.01); *G06F 18/285* (2023.01);
(Continued)

(58) Field of Classification Search
CPC .... G06F 16/2379; G06F 18/285; G06F 21/44; G06F 21/6281; G06F 2221/2125; H04L 63/0876
See application file for complete search history.

(56) References Cited

U.S. PATENT DOCUMENTS

| 11,568,209 B2 * | 1/2023 | Trost ................... G06N 3/08 |
| 2006/0004627 A1 | 1/2006 | Baluja |
| (Continued) | | |

FOREIGN PATENT DOCUMENTS

CN  108781223 A  11/2018

OTHER PUBLICATIONS

Notification of First Office Action for Chinese Application No. 202080004248.9, dated Jan. 26, 2022.
(Continued)

*Primary Examiner* — Rodman Alexander Mahmoudi
(74) *Attorney, Agent, or Firm* — MARSHALL, GERSTEIN & BORUN LLP

(57) ABSTRACT

At least one aspect of the present disclosure is directed to systems and methods of secure and privacy preserving device classification. A server can maintain a plurality of data records, each including an indication of a request and a known classification value. The server can train a context obfuscation model using each of the plurality of requests and known classification values. The server can train a classification model using resources and category information from a data structure in the memory of the client device. The server can transmit the context obfuscation model to a different plurality of client devices. The server can receive a request for classification including a classification vector and request metadata. The server can determine the classification of the device responsible for the request using the
(Continued)

classification model. The server can transmit the device classification to the device responsible for the request.

20 Claims, 6 Drawing Sheets

(51) Int. Cl.
*G06F 18/20* (2023.01)
*G06F 21/44* (2013.01)
*G06F 21/62* (2013.01)
*H04L 9/40* (2022.01)
*H04L 29/06* (2006.01)

(52) U.S. Cl.
CPC .......... *G06F 21/44* (2013.01); *G06F 21/6281* (2013.01); *G06F 2221/2125* (2013.01)

(56) References Cited

U.S. PATENT DOCUMENTS

| | | | |
|---|---|---|---|
| 2019/0258807 A1* | 8/2019 | DiMaggio | G06F 21/577 |
| 2020/0050773 A1* | 2/2020 | Schroeder | H04L 63/1416 |
| 2021/0319098 A1* | 10/2021 | Pogorelik | G06N 5/04 |

OTHER PUBLICATIONS

International Search Report and Written Opinion for PCT Appln. Ser. No. PCT/US2020/026621 dated Dec. 8, 2020 (12 pages).
First Examination Report for India Application No. 202127001999, dated Nov. 9, 2022.
Mishra et al., "Using Amazon Lex Conversation logs to monitor and improve interactions," AWS Blog (Dec. 19, 2019).

* cited by examiner

SYSTEMS AND METHODS FOR SECURE AND PRIVACY PRESERVING DEVICE CLASSIFICATION

CROSS-REFERENCE TO RELATED APPLICATIONS

The present application is a National Stage Application, filed under 35 U.S.C. 371, of International Patent Application No. PCT/US2020/026621 filed on Apr. 3, 2020 titled "SYSTEMS AND METHODS FOR SECURE AND PRIVACY PRESERVING DEVICE CLASSIFICATION," the entirety of which is incorporated by reference herein.

BACKGROUND

In a computer networked environment such as the internet, third-party content providers provide third-party content items for display on end-user computing devices. These third-party content items, for example, advertisements, can be displayed on a web page associated with a respective publisher. These third-party content items can include content identifying the third-party content provider that provided the content item.

SUMMARY

Classifying client devices can present risks to data security and unnecessarily utilize network resources. To properly classify a device, the device can send context information to a verification or classification server that can use the context information to classify the client device into one or more categories, such as an interest category, a verification category (e.g., a category that includes permissions to access protected content), or device characteristic categories (e.g., categorization or classification based on any dimension provided in the device context information, etc.), among others. Transmitting device information over a network can subject the client device to data security risks, because the security of the device information is limited by the overall security of the network as soon as it leaves the device. Furthermore, transmitting up-to-date device context information frequently to a classification server can result in over-utilization of network and computing resources.

The systems and methods discussed herein enable a classification server to generate an obfuscation model based on known client device information. The obfuscation model can take device context information as an input, and generate an obfuscated output that can be used as an input to a device classification model. The obfuscated output can be processed such that it may be difficult or impossible to determine any of the client device context information (e.g., protecting the privacy and security of protected information, etc.), but can still be used to accurately classify the client device using a classification model. In conjunction with generating the obfuscation model, the classification server can generate a classification model that can use the obfuscated output as an input along with additional non-protected metadata information. The classification model can produce an accurate estimation of the classification of the client device. The classification server can send the obfuscation model to unclassified client devices, which can use the obfuscation model to produce obfuscated outputs that are representative of their device context. Instead of transmitting the device context to the classification server, the unclassified client devices can transmit the obfuscated output to the verification server for use in device classification.

The obfuscated output can be much smaller in size than the full device context, and therefore can improve the network utilization of device classification systems by reducing the amount of transmitted over the network.

At least one aspect of this technical solution is directed to a method of generating on-device classification models to improve security, privacy, and network resource utilization. The method can be performed, for example, by one or more servers and a memory. The method can include maintaining, in a database, a plurality of data records associated with a respective plurality of client devices. Each of the data records can include an indication of a request and a known classification value. The request can include client device context information and client device metadata. The method can include training, using each of the plurality of requests and known classification values, a context obfuscation model. The context obfuscation model can be configured to receive, as input, client device context information, and provide, as output, an output classification vector. The method can include training, using each of the plurality of requests and known classification values, a classification model configured to receive, as input, a classification vector and a metadata input, and provide, as output, a device classification value. The method can include transmitting the context obfuscation model to a plurality of second client devices to obfuscate the context information of each of the plurality of client devices. The method can include receiving a request for classification, the request including (1) a classification vector created as an output of the context obfuscation model executed by the client device and (2) request metadata. The method can include determining, using the classification vector received in the request for classification and the request metadata as inputs to the classification model, a device classification. The method can include transmitting the device classification to the device responsible for the request for classification.

In some implementations, the method can include generating, by the one or more processors responsive to determining the classification of the client device, a classification data record, the classification data record including an indication of the request for classification and the device classification. In some implementations, the method can include storing the classification data record in the database in association with the device associated with the request for classification. In some implementations, the method can include updating the context obfuscation model using at least the determined device classification to create an updated context obfuscation model. In some implementations, the method can include transmitting the updated context obfuscation model to each of the plurality of second client devices. In some implementations, the method can include updating the classification model using the updated device classification and the updated context obfuscation model to create an updated classification model.

In some implementations, the method can include receiving a plurality of requests and a plurality of known classification values, the plurality of requests and the plurality of known classification each associated with the respective plurality of client devices. In some implementations, the method can include generating the plurality of data records, each of the data records including the indication of the respective request of the plurality of requests and the respective known classification value of the plurality of known classification values. In some implementations, the method can include storing in the database, the plurality of data records in association with the respective plurality of client devices. In some implementations, the method can include training, using each of the plurality of requests and known classification values, a combined model, the combined model configured to receive, as input, the client device context information and the metadata input, and provide, as output the device classification value. In some implementations, the method can include extracting, by the one or more processors, from the combined model, the context obfuscation model to generate the context obfuscation model. In some implementations, the method can include extracting from the combined model, the classification model to generate the classification model.

In some implementations, the method can include normalizing the request metadata to create a normalized metadata vector. In some implementations, the method can include determining, using the classification vector received in the request for classification and the normalized metadata vector as inputs to the classification model, the device classification. In some implementations, the method can include authenticating the device classification value to determine that the device responsible for the request for classification can access protected content. In some implementations, the method can include providing access to the protected content to the device responsible for the request for classification responsive to determining that the device responsible for the request for classification can access the protected content. In some implementations, the method can include determining a likelihood that the device responsible for the request for classification will view the protected content using the classification model. In some implementations, the request for classification indicates an actuation of a uniform resource identifier on the client device responsible for the request for classification.

At least one other aspect of this technical solution is directed to a system for generating on-device classification models to improve security, privacy, and network resource utilization. The system can include one or more processors and a memory. The system can maintain, in a database, a plurality of data records associated with a respective plurality of client devices, each of the data records including an indication of a request and a known classification value, wherein the request includes client device context information and client device metadata. The system can train, using each of the plurality of requests and known classification values, a context obfuscation model, the context obfuscation model configured to receive, as input, client device context information, and provide, as output, an output classification vector. The system can train, using each of the plurality of requests and known classification values, a classification model configured to receive, as input, a classification vector and a metadata input, and provide, as output, a device classification value. The system can transmit the context obfuscation model to a plurality of second client devices to obfuscate the context information of each of the plurality of client devices. The system can receive a request for classification, the request including (1) a classification vector created as an output of the context obfuscation model executed by the client device and (2) request metadata. The system can determine using the classification vector received in the request for classification and the request metadata as inputs to the classification model, a device classification. The system can transmit the device classification to the device responsible for the request for classification.

In some implementations, the system can generate, responsive to determining the classification of the client device, a classification data record, the classification data record including an indication of the request for classification and the device classification. In some implementations, the system can store the classification data record in the database in association with the device associated with the request for classification. In some implementations, the system can update the context obfuscation model using at least the determined device classification to create an updated context obfuscation model. In some implementations, the system can transmit the updated context obfuscation model to each of the plurality of second client devices. In some implementations, the system can update the classification model using the updated device classification and the updated context obfuscation model to create an updated classification model. In some implementations, the system can receive a plurality of requests and a plurality of known classification values, the plurality of requests and the plurality of known classification each associated with the respective plurality of client devices. In some implementations, the system can generate the plurality of data records, each of the data records including the indication of the respective request of the plurality of requests and the respective known classification value of the plurality of known classification values. In some implementations, the system can store, in the database, the plurality of data records in association with the respective plurality of client devices.

In some implementations, the system can train, using each of the plurality of requests and known classification values, a combined model, the combined model configured to receive, as input, the client device context information and the metadata input, and provide, as output the device classification value. In some implementations, the system can extract, from the combined model, the context obfuscation model to generate the context obfuscation model. In some implementations, the system can extract, from the combined model, the classification model to generate the classification model. In some implementations, the system can normalize the request metadata to create a normalized metadata vector. In some implementations, the system can determine, using the classification vector received in the request for classification and the normalized metadata vector as inputs to the classification model, the device classification. In some implementations, the system can authenticate the device classification value to determine that the device responsible for the request for classification can access protected content. In some implementations, the system can provide access to the protected content to the device responsible for the request for classification responsive to determining that the device responsible for the request for classification can access the protected content.

In some implementations, the system can determine a likelihood that the device responsible for the request for classification will view the protected content using the classification model. In some implementations, the request for classification indicates an actuation of a uniform resource identifier on the client device responsible for the request for classification.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. Aspects can be combined and it will be readily appreciated that features described in the context of one aspect of the invention can be combined with other aspects. Aspects can be implemented in any convenient form. For example, by appropriate computer programs, which may be carried on appropriate carrier media (computer readable media), which may be tangible carrier media (e.g. disks) or intangible carrier media (e.g. communications signals). Aspects may also be implemented using suitable apparatus, which may take the form of programmable computers running computer programs arranged to implement the aspect.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. These and other aspects and features of the present technical solution will become apparent to those ordinarily skilled in the art upon review of the following description in conjunction with the accompanying figures. In the drawings.

DETAILED DESCRIPTION

Figure 1:
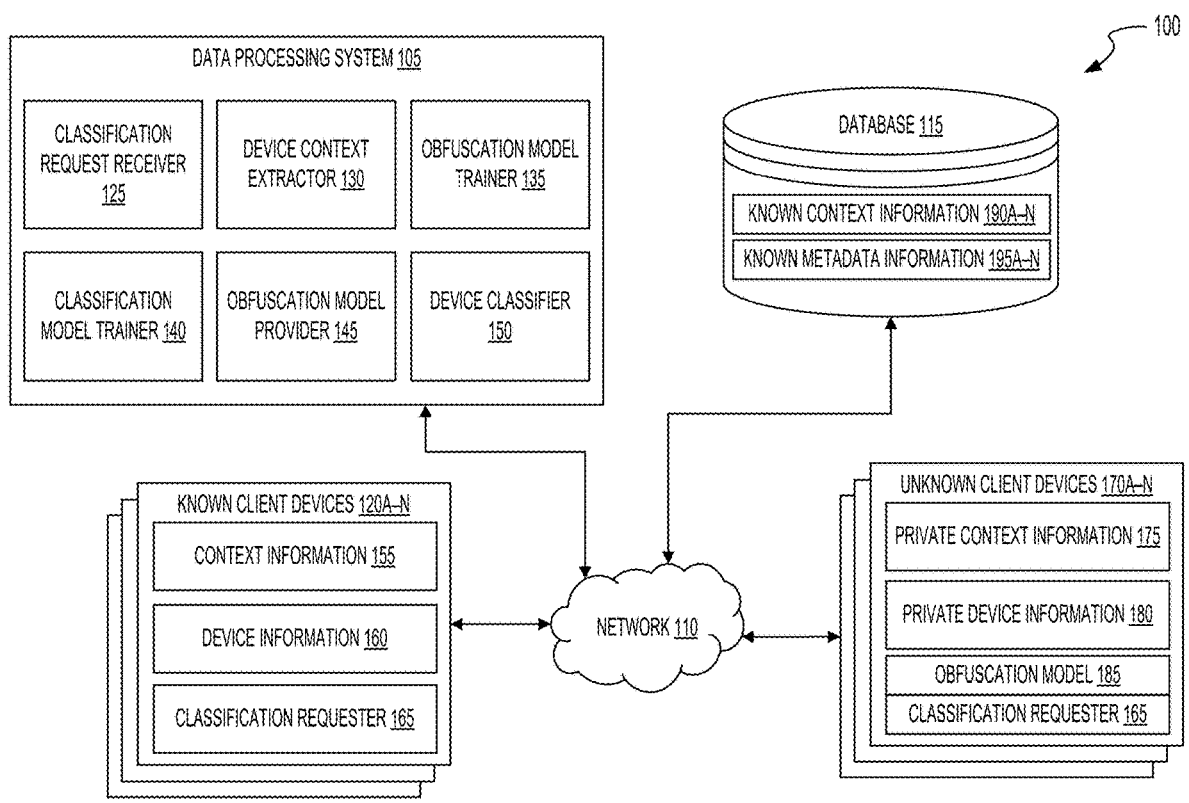
FIG. 1 shows a block diagram depicting an example system for classifying unclassified client devices in a secure and privacy preserving manner.

Below are detailed descriptions of various concepts related to, and implementations of, methods, apparatuses, and systems of generating on-device classification models to improve security, privacy, and network resource utilization. The various concepts introduced above and discussed in greater detail below may be implemented in any of numerous ways, as the described concepts are not limited to any particular manner of implementation. Examples of specific implementations and applications are provided primarily for illustrative purposes.

Device classification platforms can classify the type, aspects, behavior, and other information about client devices and their associated activities. Using contextual information from client devices, such as interaction information, location data, displayed information, operating system states, and executing application state information, among others, device classification platforms can accurately classify client devices across a number of dimensions. Typically, device classification platforms train machine learning algorithms or models (e.g., neural networks, deep neural networks, convolutional neural networks, linear regression models, etc.) to classify unknown devices using contextual information. The device classification platform can use the device information and context information to classify the device, and use the device classification to provide additional access permissions, redirection information, tailored content, a device status, device groupings, computing resource allocation, network bandwidth allocation, routing information, or other information or actions.

However, accurate classification of client devices may utilize frequent transmissions of device contextual data and device metadata. This contextual data can be relatively large, and frequent transmissions of contextual information at scale can needlessly occupy network and computing resources. Furthermore, contextual information may include sensitive device information (e.g., personal information) or information that may not be shared due to certain regulations. When the client device contextual data is transmitted, it can become susceptible to man-in-the-middle attacks, data breaches, or other network vulnerabilities, presenting a security risk to networking systems as a whole. Thus, a system that reduces the number of data transmissions containing sensitive device information while providing some protection against network vulnerabilities would be appreciated.

To address the foregoing issues, the systems and methods of this technical solution are broadly directed to a system for classifying devices based on trained model outputs, where the trained model outputs represent obfuscated contextual values gathered at each client device. The classification system can train a client-side model using known client device contextual data to provide a vector (e.g., a vector of floats, integer values, etc.) that can represent an N dimensional classification location in a client device classification space. The classification system can further train a second model, using the N dimensional classification vector and additional known metadata as inputs. The second model can provide, as an output, a classification value of a client device based on the information provided to the model as an input. After training the second model using known outputs from the first model, the classification system can distribute the first model to one or more unknown client devices.

While executing on a client device, applications can locally gather device contextual information and provide it as an input to the first model provided by the classification system. The first model then generates an N dimensional vector that is representative of the context signals of the device. The device context information can include device application states, interaction data, historical application metadata, web-browser data, device location, device location history, and wireless communication data, device hardware information, and other information available to an operating system or application executing on the client device. When the device requires an operation that involves classification, the device can request a classification from the classification system, and include the output vector in the classification request. The request can include additional data about the type of classification request (e.g., an access request, a content request, a network routing request, etc.). The classification system can use the classification vector and the additional data received from the client device as an input to the second model, and determine a device classification. The classification system can send a response including the device classification back to the client device responsible for the request.

Accordingly, the technical solution described herein can thus provide increased computational performance and reduce overall network utilization when compared with other device classification systems. Instead of providing large portions of device context information to the classification system in each classification request, each client device can locally compute a vector that occupies less space, thereby reducing the amount of data transmitted to the classification server. In turn, the classification server does not need to parse, process, or otherwise manage large amounts of device context information arriving from every client device, thereby reducing the amount of server-side computational resources required device classification. Further, by transmitting an obfuscated context vector, each client device is protected from man-in-the-middle attacks that may try to monitor or access device context information. This improves the overall security of device classification systems while protecting the privacy of the device context information from potential attackers.

FIG. 1 depicts a system 100 for classifying unclassified client devices in a secure and privacy preserving manner. The system 100 can include at least one data processing system 105. The data processing system 105 can include at least one classification request receiver 125, at least one device context extractor 130, at least one obfuscation model trainer 135, at least one classification model trainer 140, at least one obfuscation model provider 145, and at least one device classifier 150. The system 100 can include at least one computer network 110. The system 100 can include at least one database 115. The database 115 can include at least one known context information 190A-N (sometimes referred to as known context information 190) and at least one known metadata information 195A-N (sometimes referred to as known metadata information 195). The system 100 can include at least one known client devices 120A-N (sometimes referred to as known client devices 120 or known client device 120). The known client devices 120 can include at least one context information 155, at least one device information 160, and at least one classification requester 165. The system 100 can include at least one unknown client devices 170A-N (sometimes referred to as unknown client devices 170 or unknown client device 170). The unknown client devices 170 can include at least one private context information 175, at least one private device information 180, at least one obfuscation model 185, and at least one classification requester 165.

Figure 6:
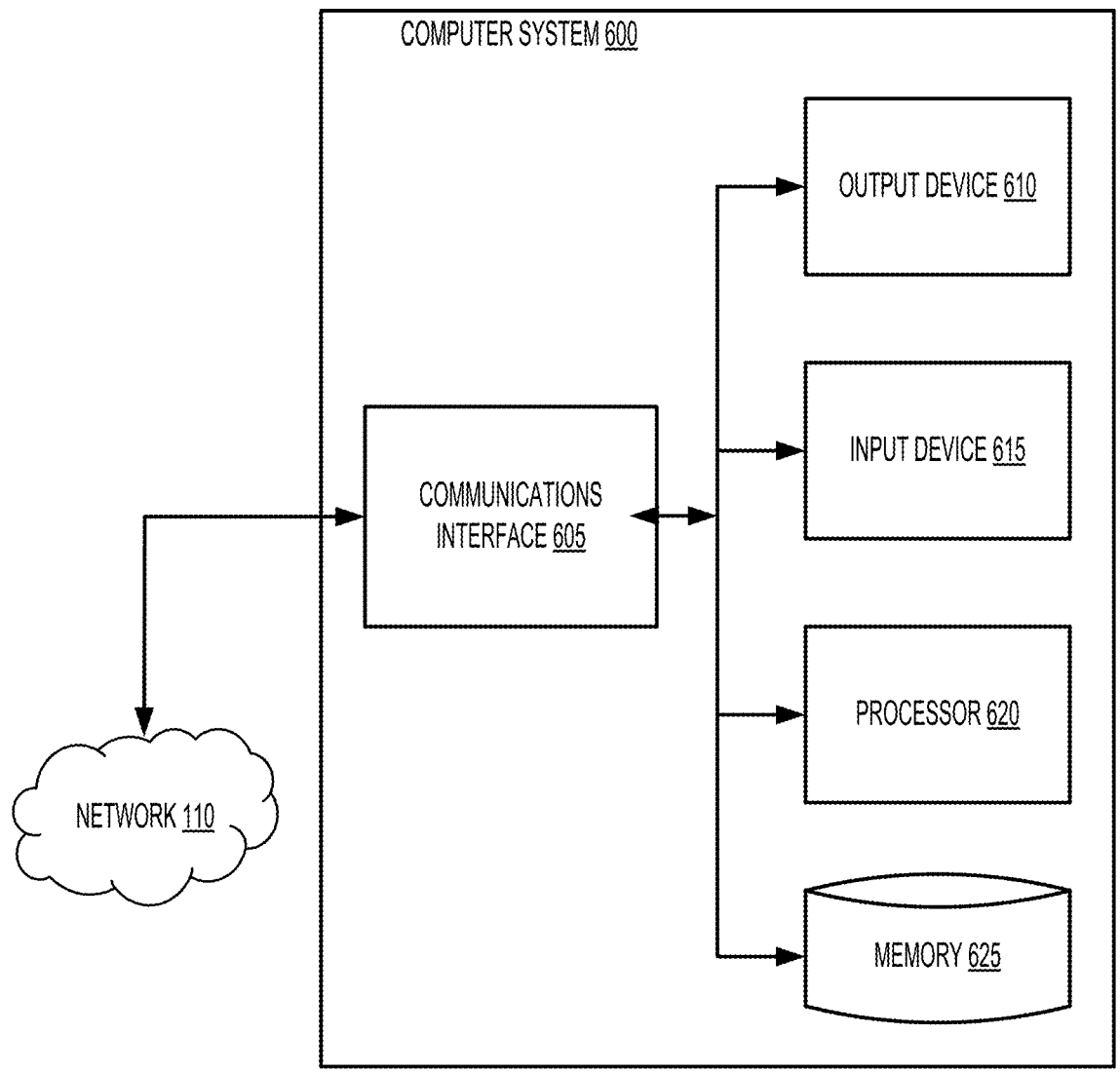
FIG. 6 shows the general architecture of an illustrative computer system that may be employed to implement any of the computers discussed herein.

Each of the components (e.g., the data processing system 105, the classification request receiver 125, the device context extractor 130, the obfuscation model trainer 135, the classification model trainer 140, the obfuscation model provider 145, the device classifier 150, the network 110, the database 115, the known context information 190, the known metadata 195, the known client devices 120, the context information 155, the device information 160, the classification requester 165, the unknown client devices 170, the private context information 175, the private device information 180, the obfuscation model 185, the classification requester 165, etc.) of the system 100 can be implemented using the hardware components or a combination of software with the hardware components of a computing system 600 detailed herein in conjunction with FIG. 6. For example, the data processing system 105 can include one or more computing devices. The known client devices 120 can include servers or other computing devices. The unknown client devices 170 can include servers or other computing devices. Each of the components of the data processing system 105 can perform the functionalities detailed herein.

The network 110 can include computer networks such as the Internet, local, wide, metro or other area networks, intranets, satellite networks, other computer networks such as voice or data mobile phone communication networks, and combinations thereof. The data processing system 105 of the system 100 can communicate via the network 110, for instance with at least one known client device 120 or at least one unknown client device 170. The network 110 may be any form of computer network that relays information between the known client devices 120, unknown client devices 170, the data processing system 105, and one or more content sources, such as web servers, amongst others. In some implementations, the network 110 may include the Internet and/or other types of data networks, such as a local area network (LAN), a wide area network (WAN), a cellular network, a satellite network, or other types of data networks. The network 110 may also include any number of computing devices (e.g., computers, servers, routers, network switches, etc.) that are configured to receive and/or transmit data within the network 110. The network 110 may further include any number of hardwired and/or wireless connections. The client device may communicate wirelessly (e.g., via WiFi, cellular, radio, etc.) with a transceiver that is hardwired (e.g., via a fiber optic cable, a CAT5 cable, etc.) to other computing devices in the network 110. The data processing system 105 may also communicate wirelessly with the computing devices of the network 110 via a proxy device (e.g., a router, network switch, or gateway). The known client devices 120 or the unknown client devices 170 may communicate wirelessly (e.g., via WiFi, cellular, radio, etc.) with a transceiver that is hardwired (e.g., via a fiber optic cable, a CAT5 cable, etc.) to other computing devices in the network 110. The known client devices 120 or the unknown client devices 170 may also communicate wirelessly with the computing devices of the network 110 via a proxy device (e.g., a router, network switch, or gateway).

The data processing system 105 can include at least one processor and a memory, i.e., a processing circuit. The memory stores processor-executable instructions that, when executed by processor, cause the processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The data processing system 105 can include one or more computing devices or servers that can perform various functions.

The database 115 can be a database configured to store and/or maintain any of the information described herein. The database 115 can maintain one or more data structures which can contain or index each of the values, pluralities, or thresholds described herein. The database 115 can be accessed using one or more memory addresses or index values. The database 115 can be accessed by the components of the data processing system 105, the known client devices 120, or the unknown client devices 170, via the network 110. In some implementations, the database 115 can be internal to the data processing system 105. In some implementations, the database 115 can exist external to the data processing system 105, and may be accessed by any of the components or devices of the system 100 via the network 110. The database 115 can be distributed across many different computer systems or storage elements, and may be accessed via the network 110 or a suitable computer bus interface. The data processing system 105 can store, in the database 115, the results of any or all computations, determinations, selections, identifications, generations, constructions, or calculations in one or more data structures indexed with appropriate values, each of which may be accessed by the data processing system 105, the known client devices 120, or the unknown client devices 170, to perform any of the functionalities or functions described herein.

The known context information 190 can include information retrieved from, or received from, the known client devices 120. For example, one or more of the known client devices 120 can send, provide, or otherwise transmit one or more classification requests that include device context information to the data processing system 105. The data processing system 105, or the known client devices 120, can store that device context information in one or more data structures in the database 115 as the known context information 190. The known context information 190 can include, for example, text that is displayed on the known client device 120, text that is not displayed on the known client device 120, search queries (e.g. including one or more keywords, terms, etc.) input to the known client device 120, historical search queries (e.g. including one or more keywords, terms, etc.), known client device 120 input or interaction events (e.g., coordinates, associated application, time of interaction or input, frequency of interaction, etc.), time values associated with any of the context information described herein, time periods of usage in any application executable by the known client device 120, applications executing or resident on the known client device 120, metadata (e.g., keywords, content items, interaction events, historical interaction events, profile information, timestamp information, etc.) associated with applications executing or stored on the known client device 120, web browsing history, interaction history, facial recognition information, biometric information (e.g., fingerprints, eye color, hair color, etc.), regular periods of device use, known client device 120 charging information (e.g., power levels, battery, regular charging times or seasonalities, etc.), regular periods of known client device 120 non-use, communication history (e.g., text or SMS message history, call history, video call history, call information, video call information, etc.), and other information that may be used or accessed by any application or operating system executed by the known client device 120.

The known context information 190 can include other information about the known client device 120, such as the device information 160 of the known client devices 120. The known context information 190 can be one or more data records that maintain the context information 155 of the known client devices 120 over time. Accordingly, while the context information 155 may only include the most current or up-to-date context information of the known client devices 120, the known context information 190 can be a historic record of all device contexts in a variety of settings, across all of the classification requests provided by the known client devices 120. The known context information 190 can include one or data records that include an indication (e.g., an identifier, memory location, etc.) of a classification request stored in the database 115. For example, each of the known context information 190 data records can include a pointer to a location in the database 115 that includes a request for classification from a known client device 120. In some implementations, the request can include the context information and the known metadata information 195 of the known client device 120.

The known metadata information 195 can be collected from one or more classification requests received from, provided by, or transmitted by, the known client devices 120. The known metadata information 195 can describe information that is not protected or private, but may be included in the requests for device classification. The known metadata information 195 can include, for example, information from the application or operating system making the request executing on the known client device 120, such as application state, the time the request was made, information about the application, and other non-protected or non-private information. The metadata can include one or more variables, strings, terms, keywords, or other information that may have led to the request for the device context. The known metadata information 195 can include metadata information from the classification requester 165 of the known client devices 120.

Each of the known client devices 120 can include a processor and a memory, i.e., a processing circuit. The memory stores machine instructions that, when executed by processor, cause processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language.

Each of the known client devices 120 can be computing devices configured to communicate via the network 110 to provide classification requests using the classification requester 165 and receive indications of or messages including device classification device classification information from the data processing system 105. The known client devices 120 can be desktop computers, laptop computers, tablet computers, smartphones, personal digital assistants, mobile devices, consumer computing devices, servers, clients, digital video recorders, set-top boxes for televisions, video game consoles, or any other computing device configured to communicate via the network 110, among others. The known client devices 120 can transmit one or more requests for device classification to the data processing system 105. The known client devices 120 can receive one or more indications of or messages including device classification information from the data processing system 105.

The context information 155 included in each of the known client devices 120 can include information about the current or historical (e.g., records of past device contexts, etc.) device context of the respective known client device 120. The context information 155 can include, for example, text that is displayed on the known client device 120, text that is not displayed on the known client device 120, search queries (e.g. including one or more keywords, terms, etc.) input to the known client device 120, historical search queries (e.g. including one or more keywords, terms, etc.), known client device 120 input or interaction events (e.g., coordinates, associated application, time of interaction or input, frequency of interaction, etc.), time values associated with any of the context information described herein, time periods of usage in any application executable by the known client device 120, applications executing or resident on the known client device 120, metadata (e.g., keywords, content items, interaction events, historical interaction events, profile information, timestamp information, etc.) associated with applications executing or stored on the known client device 120, web browsing history, interaction history, facial recognition information, biometric information (e.g., fingerprints, eye color, hair color, etc.), regular periods of device use, known client device 120 charging information (e.g., power levels, battery, regular charging times or seasonalities, etc.), regular periods of known client device 120 non-use, communication history (e.g., text or SMS message history, call history, video call history, call information, video call information, etc.), and other information that may be used or accessed by any application or operating system executed by the known client device 120. The known client device 120 can scan for changes in the device context, and update the context information 155 appropriately. The context information 155 can be stored, for example, in one or more data structures in the memory of the known client device 120.

The device information 160 can include device specific information, such as device type, model number, serial number, operating system version, vendor identification, and other information about the known client device 120. The device information can include display information or other technical specifications about the known client device 120, such as processor information, display resolution, screen type, touch capabilities, amount of memory, amount of available memory, amount of video memory, amount of available video memory, machine learning capabilities, information about specific chipsets (e.g., graphics hardware acceleration, machine learning hardware acceleration, etc.), and other information about the capabilities of the known client device 120. This information can be stored, for example, in one or more data structures in the memory of the known client device 120. In some implementation, the known client device 120 can update the device information 160 if there is a detected change in the device configuration (e.g., change in amount of storage from a new memory card, etc.).

The classification requester 165 of the known client device 120 can transmit, request, or otherwise provide a request for classification from the data processing system 105. The classification requester 165 can generate a request for classification that includes some or all of the context information 155 and some or all of the device information 160. The classification requester 165 can assemble metadata to include in the request, such as information about the request for classification, the application that makes the request for classification, and other information about the request for classification. In some implementations, after generating the request for classification, the classification requester 165 can store or maintain the request for classification in one or more data structures in the memory of the known client device 120. The classification requester 165 can transmit the request for classification to the data processing system 105 via the network 110. In addition, because the classification of the known client device 120 can be known to the known client device 120, the classification request can include the classification of the known client device 120. In such situations, the classification request can be provided to the data processing system to provide training data for the obfuscation and classification models provided by.

Each of the unknown client devices 170 can include a processor and a memory, i.e., a processing circuit. The memory stores machine instructions that, when executed by processor, cause processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language.

Each of the unknown client devices 170 can be computing devices configured to communicate via the network 110 to provide classification requests using the classification requester 165 and the obfuscation model 185, and receive indications of or messages including device classification device classification information from the data processing system 105. The unknown client devices 170 can be desktop computers, laptop computers, tablet computers, smartphones, personal digital assistants, mobile devices, consumer computing devices, servers, clients, digital video recorders, set-top boxes for televisions, video game consoles, or any other computing device configured to communicate via the network 110, among others. The unknown client devices 170 can transmit one or more requests for device classification to the data processing system 105. The unknown client devices 170 can receive one or more indications of or messages including device classification information from the data processing system 105.

The private context information 175 included in each of the unknown client devices 170 can include information about the current or historical (e.g., records of past device contexts, etc.) device context of the respective unknown client device 170. The private context information 175 can include, for example, text that is displayed on the unknown client device 170, text that is not displayed on the unknown client device 170, search queries (e.g. including one or more keywords, terms, etc.) input to the unknown client device 170, historical search queries (e.g. including one or more keywords, terms, etc.), unknown client device 170 input or interaction events (e.g., coordinates, associated application, time of interaction or input, frequency of interaction, etc.), time values associated with any of the context information described herein, time periods of usage in any application executable by the unknown client device 170, applications executing or resident on the unknown client device 170, metadata (e.g., keywords, content items, interaction events, historical interaction events, profile information, timestamp information, etc.) associated with applications executing or stored on the unknown client device 170, web browsing history, interaction history, facial recognition information, biometric information (e.g., fingerprints, eye color, hair color, etc.), regular periods of device use, unknown client device 170 charging information (e.g., power levels, battery, regular charging times or seasonalities, etc.), regular periods of unknown client device 170 non-use, communication history (e.g., text or SMS message history, call history, video call history, call information, video call information, etc.), and other information that may be used or accessed by any application or operating system executed by the unknown client device 170. The unknown client device 170 can scan for changes in the device context, and update the private context information 175 appropriately. The private context information 175 can be stored, for example, in one or more data structures in the memory of the unknown client device 170. Because the private context information 175 is private, and not shared with any other computing device, the private context information 175 can be stored in a protected region of memory on the unknown client device 170. Such a region of memory can be protected such that the information contained therein may not be transmitted via the network 110 to other computing devices, or shared to other computing devices by other means.

The private device information 180 can include device specific information, such as device type, model number, serial number, operating system version, vendor identification, and other information about the unknown client device 170. The private device information 180 can include display information or other technical specifications about the unknown client device 170, such as processor information, display resolution, screen type, touch capabilities, amount of memory, amount of available memory, amount of video memory, amount of available video memory, machine learning capabilities, information about specific chipsets (e.g., graphics hardware acceleration, machine learning hardware acceleration, etc.), and other information about the capabilities of the known client device 120. This information can be stored, for example, in one or more data structures in the memory of the unknown client device 170. In some implementation, the unknown client device 170 can update the private device information 180 if there is a detected change in the device configuration (e.g., change in amount of storage from a new memory card, etc.). Because the private device information 180 is private, and not shared with any other computing device, the private device information 180 can be stored in a protected region of memory on the unknown client device 170. Such a region of memory can be protected such that the information contained therein may not be transmitted via the network 110 to other computing devices, or shared to other computing devices by other means.

The unknown client devices 170 can receive at least one obfuscation model 185 from the data processing system 105. Receiving the obfuscation model 185 can be responsive to a request for the obfuscation model 185, or in response to another event that prompts the data processing system 105 to provide the obfuscation model 185 to the unknown client devices 170. The obfuscation model 185 can be any kind of machine learning model that is trained by the data processing system 105 using the context information and classification information received from the known client devices 120. The obfuscation model 185 can take, as inputs, an input vector comprising data from the private context information 175 and the private device information 180. The obfuscation model 185 can include one or more weights, biases, or coefficients used to generate an output vector form an input vector. The unknown client devices 170 can apply weights, biases, and other coefficients to the input vector to generate an output vector. Applying the weights and biases can include performing one or more mathematical operations, such as multiplication, addition, and or other operations on the input vector across one or more layers of the obfuscation model 185. The output vector generated by the obfuscation model 185 can completely obfuscate the information in the input vector, which can represent the private context information 175 and the private device information 180. The output vector can be configured such that the input vector cannot be computed form only the output vector. The output vector can be provided to the data processing system 105 for further device classification without compromising or sharing the private context information 175 or the private device information 180. This provides an improvement the security, privacy, and network resource utilization of device classification computer systems.

The classification requester 165 of the unknown client devices 170 can transmit, request, or otherwise provide a request for classification from the data processing system 105. The classification requester 165 can generate a request for classification that includes the output vector generated by the obfuscation model 185 instead of the private context information 175 and the private device information 180. In some implementations, the classification requester 165 can be prevented from accessing the regions of memory that contain the private context information 175 and the private device information 180. The classification requester 165 can assemble metadata to include in the request, such as information about the request for classification, the application that makes the request for classification, and other information about the request for classification. In some implementations, after generating the request for classification, the classification requester 165 can store or maintain the request for classification in one or more data structures in the memory of the unknown client device 170. The classification requester 165 can transmit the request for classification to the data processing system 105 via the network 110.

In response to a classification request, the known client device 120 or the unknown client device 170 can receive a classification message. After receiving the classification message from the server, the known client device 120 or the unknown client device 170 can parse the classification message to retrieve the device classification information requested by the application or operating system of the known client device 120 or the unknown client device 170. Parsing the classification message can include extracting one or more authentication keys, numbers, or codes from the classification message and storing them in a different region of memory on the client device. In some implementations, the classification message can include content, such as images, text, video, or other information associated with the device classification. In some implementations, the device classification message can include instructions to display the content included in the classification message on the known client device 120 or the unknown client device 170, or modify an information resource on the known client device 120 or the unknown client device 170 to display the content in the classification message. In some implementations, based on other instructions included in the classification message, the known client device 120 or the unknown client device 170 can send an additional message including the authentication key to an external computing device for further processing. Such implementations may be used, for example, to authenticate the device for use in external systems.

The classification request receiver 125 can receive, accept, parse, or otherwise process classification requests from the known client devices 120 and the unknown client devices 170. If the classification request receiver 125 receives a classification request from a known client device 120, the classification request receiver 125 can parse the device classification from the request and store it in one or more data structures in association with an identifier of the known client device 120, to facilitate training of the classification model and the obfuscation model. In some implementations, the classification request receiver can receive, in the request for classification, an indication of an actuation of a uniform resource identifier on the known client device 120 responsible for the request. If the classification request receiver receives a classification request from an unknown client device 170, the classification request receiver 125 can parse the output vector from the request and store it in one or more data structures in association with an identifier of the unknown client device 170, to facilitate classification of the unknown client device 170 using the classification model. The requests for classification can include, for example, device context information (e.g., context information 155, device information 160, etc.). Each request, when received, can be stored in one or more data structures in the memory of the data processing system in association with an identifier of the known client device 120 responsible for the respective request. Each request can include the identifier of the respective client device responsible for the request. The classification request receiver 125 can store each request, along with the identifier, with an index value used to iterate through each request. The classification request receiver 125 can parse, process, or otherwise extract the device context information from each classification request.

The device context extractor 130 can access one or more data structures including a request for classification from a known client device 120 to extract metadata, context information, and device classification from the request. In some implementations, the device context extractor 130 can have the metadata and context information already stored in one or more data structures in the memory of the data processing system. If so, the device context extractor 130 can use the stored information. The device context extractor 130 can parse the selected request to extract the known context information 190 or the context information 155, the known metadata information 195, or the device information 160. If the request for classification is received form an unknown client device 170, the device context extractor 130 can extract the output vector generated by the obfuscation model 185 executing on the unknown client device 170. The data processing system can extract the context information accessed from one or more data structures in the memory of the data processing system 105 or the database 115 and from the requests or from the context information received from the known client devices 120, and associate (e.g., store in a data structures, etc.) the context information with the respective classification of the known client device 120. In some implementations, the data processing system can store and access the known context information 190 and the known metadata information 195 from a database (e.g., the database 115).

The obfuscation model trainer 135 can train an obfuscation model to facilitate the classification of unknown client devices 170 without requesting or accessing the private context information 175 or the private device information 180 of the unknown client devices 170. To train the obfuscation model, the obfuscation model trainer 135 can use the known classifications stored in association with the known context information 190 and the known metadata information 195 to train the obfuscation model to generate an output vector that is representative of the context information. The obfuscation model trainer 135 can generate an obfuscation model to include one or more layers, coefficients, weight values, or bias values. The obfuscation model can be any kind of neural network or machine learning model (e.g., linear regression, recurrent neural network, convolutional neural network, fully connected neural network, sparse vector machine, random forest, etc.). The obfuscation model trainer 135 can provide the known context information 190 as input to the obfuscation model. Providing the known context information 190 as input can include formatting or structuring the known context information 190 extracted from a request from a known client device 120 or accessed from an entry in the database 115 into a format that can be input into the obfuscation model. For example, this can include extracting individual values of the known context information 190 or known metadata information 195 and restructuring them into an input vector with one or more coordinates. Each coordinate of the input vector can correspond to one item of known context information 190 or known metadata information 195. In some implementations, the input vector can have a predetermined order that the data processing system can populate based on what is present in the known context information 190 entry or known metadata information 195 entry. In some implementations, the input vector can have a predetermined number of coordinates, where each coordinate corresponds to a single value of context information. If the known context information 190 entry or the known metadata information 195 entry does not include information that corresponds to a particular coordinate of the input vector, the data processing system can populate that coordinate with a placeholder value. The placeholder value can be a predetermined number, for example, zero. If the known context information 190 or known metadata information 195 does include information that corresponds to a particular coordinate of the input vector, the obfuscation model trainer 135 can populate that vector with the corresponding context information or metadata.

The obfuscation model trainer 135 can compute an output vector using the input vector and the obfuscation model. Computing the output vector can include multiplying the input vector by one or more coefficients, for example in a layer of neural network (e.g., deep neural network, convolutional neural network, etc.). Computing the output vector can include multiplying the input vector through one or more layers of a neural network or machine learning model. The obfuscation model can produce an output vector with one or more coordinates, where the output vector is an obfuscated vector representing the known context information 190 entry and the known metadata information 195 used as an input to the obfuscation model. In some implementations, the output vector can be obfuscated to a degree such that the values of the coordinates of the input vector cannot be determined from the output vector. Accordingly, the obfuscation model can produce vectors that can represent in the information included in the device context without revealing the values present in the device context. The obfuscation model trainer 135 can store the output vector in one or more data structures in the memory of the data processing system 105, in association with the known classification of the respective known client device 120 corresponding to the known context information 190 and the known metadata information 195 used to create the input vector.

The classification model trainer 140 can generate or train more than one classification model. For example, the classification model trainer 140 can train a classification model for a different type of device classification. Types of device classification can include, for example, a classification indicating a future action by a client device (e.g., interaction with content, etc.), a classification indicating an authentication or permission assigned to the client device (e.g., proper authorization to access or modify protected content, etc. Although the disclosure below includes an exemplary explanation of training at least one classification model, it should be understood that the classification model trainer 140 can train multiple models corresponding to different classification types, each classification model having inputs and outputs that correspond to the classification type of the model. For example, a classification model corresponding to an authentication request may use an obfuscated vector and information associated with protected content (e.g., a request for protected content, a request to access or modify protected content, etc.) as inputs. The classification model trainer 140 can output a value that corresponds to the likelihood that the device that provided the obfuscated vector will interact with content provided by the data processing system 105. In another example, the classification model trainer 140 can train a classification model that can output a selection of content (e.g., based on permission, protected content, other content, etc.) to provide to the client device associated with the obfuscated vector. Each of the output types or classification model types can be trained by the classification model trainer 140 as described herein.

After the classification model trainer 140 has passed the output vector through the classification model to predict a classification of the known client device 120, the obfuscation model trainer can compare the predicted classification of the known client device 120 to the known classification of the known client device 120 to train the obfuscation model. Comparing can include subtracting, or otherwise determining a difference across one or more dimensions between the known classification of the known client device 120 and the predicted classification of the known client device 120. The obfuscation model trainer 135 can use the compared differences to create a difference vector. The obfuscation model trainer 135 can use the difference vector to update the weights, biases, or coefficients comprising the obfuscation model to train the obfuscation model. In some implementations, the obfuscation model trainer 135 can store one or more difference vectors in batches to utilize in a batch training configuration. In some implementations, the obfuscation model trainer 135 can use a gradient descent algorithm to update the weights, biases, and coefficients comprising the obfuscation model. Training the obfuscation model can improve the likelihood that the output of the obfuscation model will generate an output vector that can be used as input to the classification model to more accurately predict the classification of a client device (e.g., the unknown client devices 170, the known client devices 120, etc.). In some implementations, the obfuscation model trainer 135 can update the obfuscation model responsive to classifying at least one known client device 120, thereby generating an updated obfuscation model. Upon generating an updated obfuscation model, the obfuscation model provider 145 can provide the updated obfuscation model to one or more unknown client devices 170.

The classification model trainer 140 can use the output vector generated by the obfuscation model as an input, along with additional request metadata. The request metadata can be stored, for example, in the database 115 as the known metadata information 195. The classification request receiver 125 can parse the classification requests received from the known client devices 120 and send the extracted metadata to the classification model trainer 140 to train the classification model. The request metadata can be received from the classification request receiver 125. The classification model trainer can use the request metadata and the output vector generated by the obfuscation model to train the classification model. Using those inputs, the classification model can generate a predicted device classification of the known client device 120. The classification model trainer 140 can compare the predicted output of the classification model trainer to the known classification of the known client device 120. Comparing can include subtracting, or otherwise determining a difference across one or more dimensions between the known classification of the known client device 120 and the predicted classification of the known client device 120. The classification model trainer 140 can use the compared differences to create a difference vector. The classification model trainer 140 can use the difference vector to update the weights, biases, or coefficients comprising the classification model to train the classification model. In some implementations, the classification model trainer 140 can store one or more difference vectors in batches to utilize in a batch training configuration. In some implementations, the classification model trainer 140 can use a gradient descent algorithm to update the weights, biases, and coefficients comprising the obfuscation model. In some implementations, the request metadata can be used to generate an input vector prior to classification using the classification model. The classification model trainer 140 or device classifier 150 can normalize the input vector prior to device classification using the classification model. In some implementations, the classification model trainer 140 can update the classification model responsive to classifying at least one known client device 120, thereby generating an updated classification model.

In some implementations, the classification model trainer 140 can train the classification model and the obfuscation model as a combined model. The combined model can receive, as input, the context information from a known client device, and request metadata from a request for classification. The combined model can provide, as an output, an output classification vector. The classification model trainer 140 can extract the obfuscation model and the classification model from the combined model. Extracting the obfuscation model and the combined model can include extracting one or more weights, biases, or coefficients from the combined model, and assembling those coefficients as the obfuscation model or the classification model. An illustrative representation of training the obfuscation model and the classification model is depicted in FIG. 2.

Figure 2:
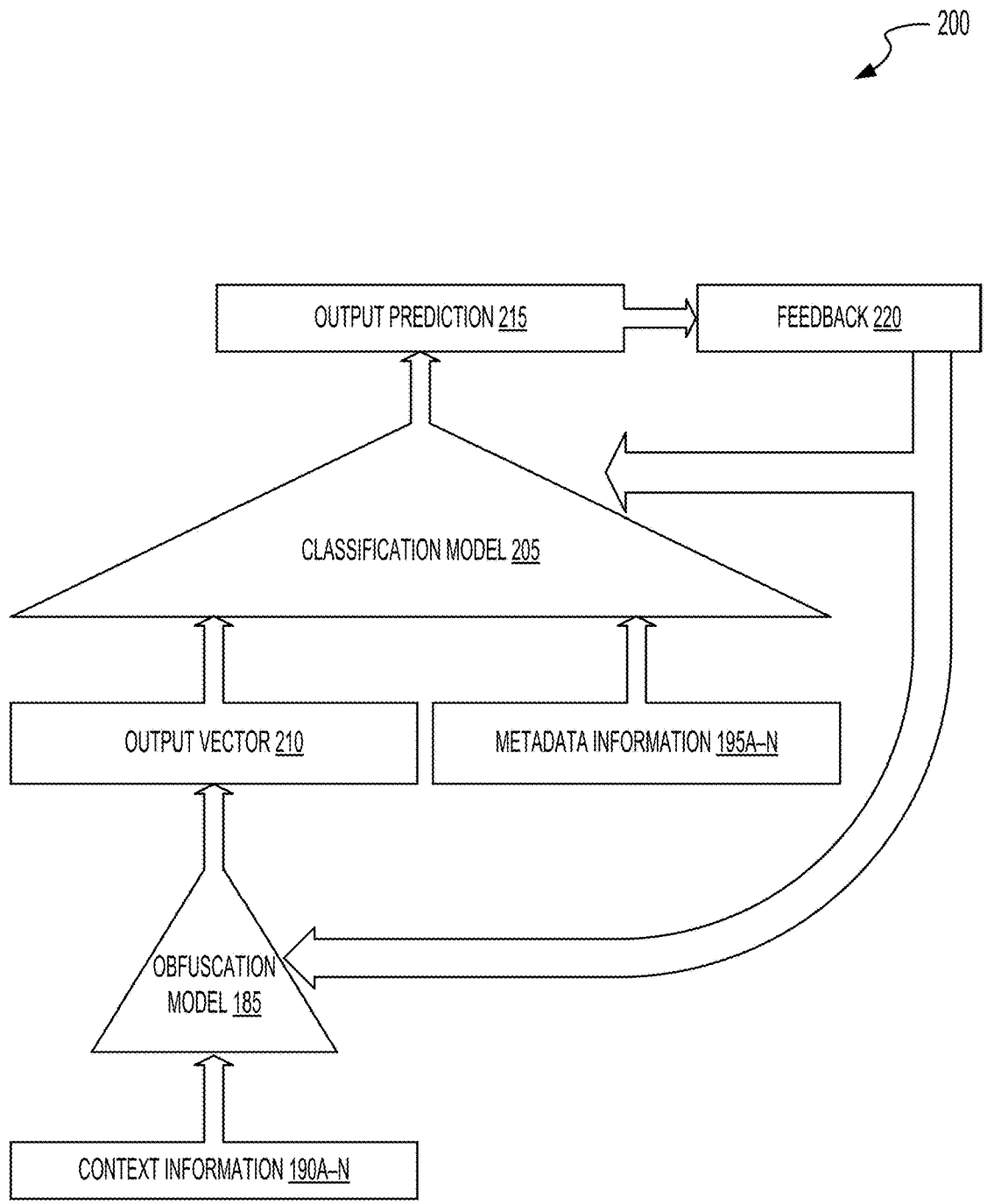
FIG. 2 shows an illustrative diagram of training obfuscation and classification models based on context information and feedback.

Referring now to FIG. 2, depicted is a diagram 200 of training obfuscation and classification models based on context information and feedback. First, the obfuscation model trainer 135 can input the known context information 190 to the obfuscation model 185 that is to be trained. Although the obfuscation model 185 is depicted as residing in the unknown client devices 170 in FIG. 1, the obfuscation model 185 is first trained in the memory of the data processing system 105 and then provided to the unknown client devices 170. The obfuscation model 185 can output an output vector 210. The classification model trainer 140 can use the output vector 210 and the known metadata information 195 as inputs to the classification model 205, which is resident in the memory of the data processing system 105.

The classification model can apply one or more layers of weights, biases, or coefficients to the input vectors, and can output an output prediction 215 as a vector with one or more coordinates. In the first iterations of training, the output prediction 215 may be very different from the actual known classification of the known client device 120. As training continues, the weights and biases of the classification model 205 and the obfuscation model 185 are tuned by the classification model trainer 140 and the obfuscation model trainer 135 respectively to cause the models to output more accurate predictions. The classification model trainer 140 and the obfuscation model trainer 135 can compare the output prediction 215 to the known classification of the known client device 120 to generate the feedback 220. The feedback 220 can include a vector with one or more coordinates that correspond to the magnitude of the differences between the output prediction and the known classification of the known client device 120. The obfuscation model trainer 135 and the classification model trainer 140 can use the feedback 220 to update the obfuscation model 185 and the classification model 205, as described herein above.

Referring back to FIG. 1, the obfuscation model provider 145 can provide the obfuscation model to the unknown client devices 170 as the obfuscation model 185. Providing the obfuscation model can include copying the obfuscation model (e.g., weights, biases, configuration information, computer-executable instructions, scripts, etc.) from one region of the memory of the data processing system 105 to another region of memory in the data processing system 105. Providing the classification model to unknown client devices 170 can include transmitting the obfuscation model to the unknown devices via a network (e.g., the network 110, etc.) for storage on the unknown client devices 170 as the obfuscation model 185. In some implementations, the obfuscation model provider 145 can compress the obfuscation model using one or more compression algorithms, thereby reducing network resource utilization when transmitting the obfuscation model to many unknown client devices 170. In some implementations, the obfuscation model provider 145 can combine, package, or otherwise include the obfuscation model in one or more messages or packets, for example as part of a software distribution or another type of content package.

The device classifier 150 can classify one or more unknown client devices 170 using the output of the obfuscation model 185 and request metadata. The device classifier 150 can receive one or more requests for device classification from an unknown client device 170. The request for classification can include an output vector generated by the obfuscation model 185 on the unknown client device 170. The output vector can be generated by inputting the private context information and the private device information 180 into the obfuscation model 185. The request for classification can include additional request metadata that can be used as an input to the classification model generated by the classification model trainer 140. The device classifier 150 can parse the request for classification received from the unknown client device 170 to extract both the output vector and the request metadata for input to the classification model. The request metadata can indicate one or more classification types that correspond to one or more classification models generated and trained by the classification model trainer 140.

The device classifier 150 can input the output vector and the request metadata into one or more classification models generated and trained by the classification model trainer 140. The device classifier 150 can apply the one or more classification models to the inputs by using one or more multiplication or addition operations to generate one or more predicted classifications. Each of the one or more predicted classifications can correspond to a respective classification type (e.g., access to protected content, device permissions, device authentication, device action prediction, device type, other classification types described herein, etc.). The device classifier 150 can select the classification models based on the contents of the request metadata, or any other data included in the classification request. The predicted classification can be a vector having one or more coordinates. In some implementations, the output of the classification model can be an authentication key, code, or token. The device classifier 150 can select content to include in a classification message based on the predicted classification of the unknown client device 170. The device classifier can include the content (e.g., images, text, videos, etc.) in the classification message, along with the predicted classification of the client device. The device classifier 150 can transmit or provide the classification message to the unknown client device 170 responsible for the request. In some implementations, the device classifier 150 can generate the classification message to include an indication of the request for classification and the device classification. The device classifier 150 can store the classification message in the database in association with an identifier of the device responsible for the request for classification. In some implementations, the device classifier can use the authentication key, code, or token to determine whether the device responsible for the request can access protected content. If the device classifier determines that the device responsible for the request can access the protected content, the device classifier 150 can include that information in the classification message. In some implementations, the device classifier 150 can include a link or an identifier of the protected content, or the protected content itself, along with an indication that the device can access the protected content. In some implementations, the device classifier 150 can use the classification model to determine a likelihood that the device responsible for the request for classification will access the protected content. The classification message can include one or more device classification outputs from the one or more classification models generated and trained by the classification model trainer 140. In some implementations, the data processing system 105 can select an initial set of content (e.g., protected content, other content described herein, etc.) based on the classification request. The device classifier 150 can use the information generated by the one or more classification models to select, from the set of content, content to include in the classification model based on the outputs from the one or more classification models. The process of device classification is illustrated in an example diagram in FIG. 3.

Figure 3:
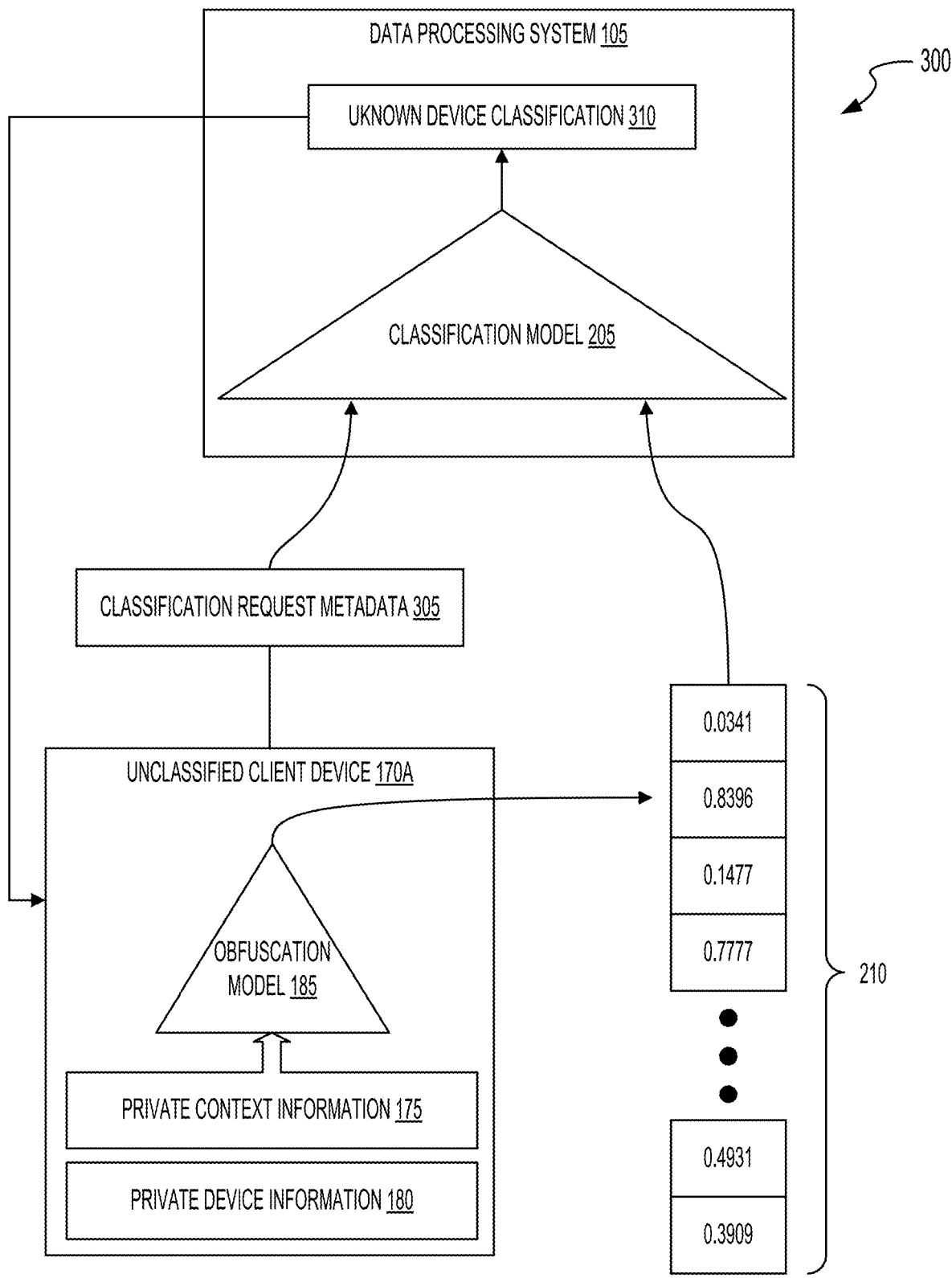
FIG. 3 shows an illustrative diagram of classifying an unclassified client devices using an on-device obfuscation model and a classification model.

Referring now to FIG. 3, illustrated is a block diagram 300 depicting classifying an unknown client device 170 using an on-device obfuscation model 185 and a classification model 205. The diagram 300 depicts an unclassified client device 170A in communication with the data processing system 105. The unclassified client device 170A includes the obfuscation model 185, the private context information 175, and the private device information 180. The data processing system 105 as depicted in the block diagram 300 can include a classification model 205 that is resident in the memory of the data processing system 105.

As depicted in the diagram, the unclassified client device 170A (also described herein as the unknown client device 170) can input the private context information 175 and the private device information into the obfuscation model 185 to generate an output vector 210. The output vector 210 can include one or more coordinates of any data type. As depicted in diagram 300, the output vector 210 includes coordinates that each include a floating point value. Although the output vector 210 is depicted as residing outside of the unclassified client device 170A, it should be understood that the output vector is resident in the memory of the unclassified client device 170A, and is depicted as residing outside for illustrative purposes.

The unclassified client device 170A can create a request for classification that includes both classification request metadata 305 and the output vector 210. The classification request metadata 305 can include information about the request for classification, or any non-private information that may be used as information to classify the unclassified client device 170A. Although depicted as separate transactions in diagram 300, it should be understood that the request for classification can be provided by the unclassified client device 170A in a single communication, and can include both the classification request metadata 305 and the output vector 210. However, in some implementations, the classification request metadata 305 and the output vector can be provided in two or more communications from the unclassified client device 170A.

The data processing system 105 (or one or more of the components thereof, such as the device classifier 150, etc.) can receive the request for classification and extract the classification request metadata 305 and the output vector 210. The data processing system 105 can generate an input vector to the classification model 205. The classification model 205 can use the input vector as an input, and can generate an unknown device classification 310. The data processing system 105 can generate a device classification message that includes the unknown device classification 310 and content selected based on the unknown device classification 310, and can provide the classification message to the unclassified client device 170A.

Figure 4:
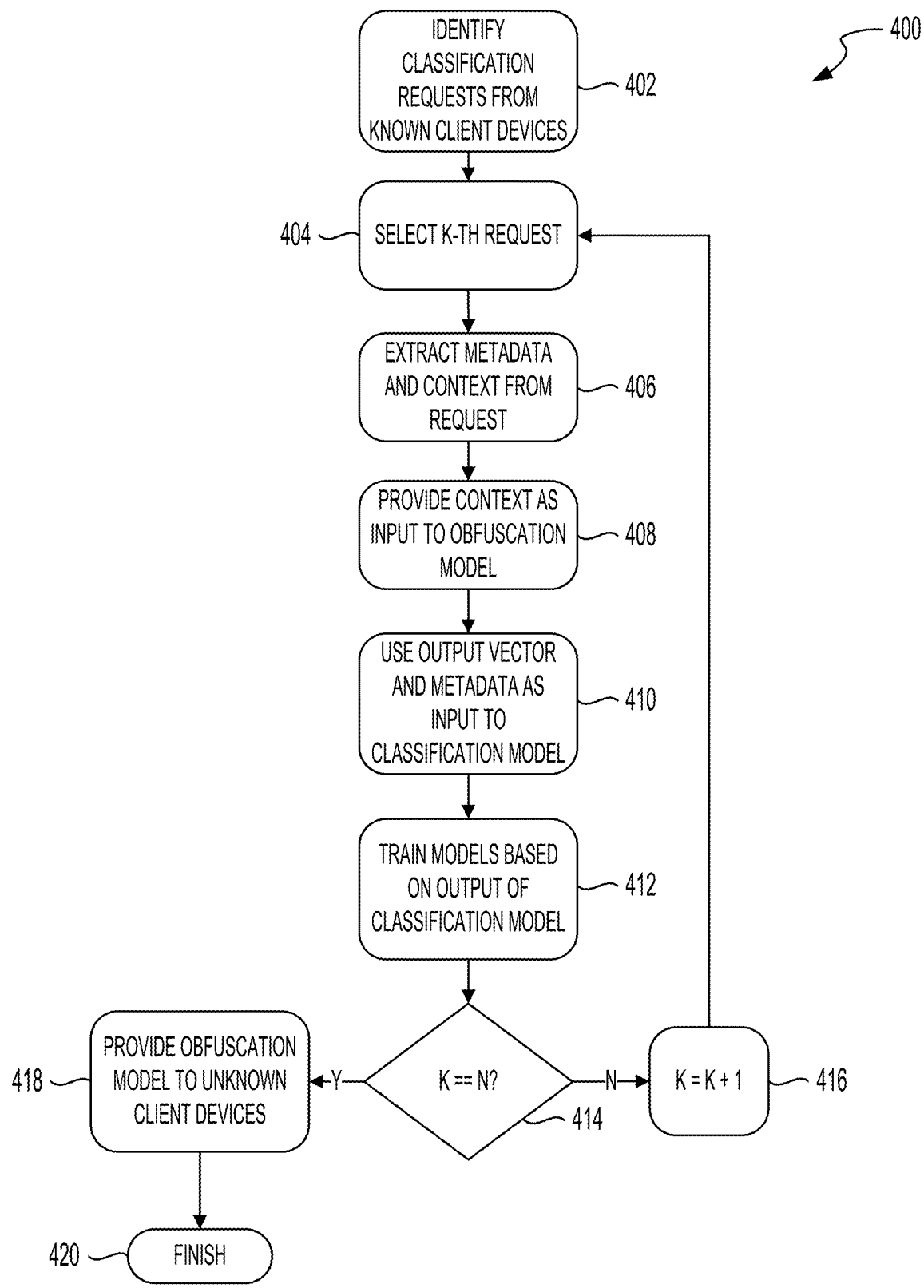
FIG. 4 shows a flow diagram of a method of training obfuscation models for distribution to unclassified client devices.

Referring now to FIG. 4, illustrated is a flow chart of an example method 400 of generating on-device classification models to improve security, privacy, and network resource utilization. The method 400 can be performed or otherwise executed by the data processing system 105, the computer system 600 described herein in conjunction with FIG. 6, or any other computing devices described herein. A data processing system (e.g., the data processing system 105, any other computing device described herein, etc.) can identify classification requests from known (e.g., classified) client devices (e.g., the known client devices 120) (ACT 402). The data processing system can select the k-th request (ACT 404). The data processing system can extract metadata and context information from the selected request (ACT 406). The data processing system can provide context as input to an obfuscation model (ACT 408). The data processing system can use an output vector and metadata as input to a classification model (ACT 410). The data processing system can train models based on output of classification model (ACT 412). The data processing system can determine whether the counter register k is equal to the number of requests n (DECISION 414). The data processing system can increment the counter register k (ACT 416). The data processing system can provide obfuscation model to unknown (e.g., unclassified, etc.) client devices (e.g., the unknown client devices 170) (ACT 418). The data processing system can finish generating on-device classification models (ACT 420).

The data processing system (e.g., the data processing system 105, any other computing device described herein, etc.) can identify classification requests from known (e.g., classified) client devices (e.g., the known client devices 120) (ACT 402). The data processing system can receive one or more requests for classification from known or classified client devices via a network (e.g., network 110). The requests for classification can include, for example, device context information (e.g., context information 155, device information 160, etc.). Each request, when received, can be stored in one or more data structures in the memory of the data processing system in association with an identifier of the client device responsible for the respective request. Each request can include the identifier of the respective client device responsible for the request. The data processing system can store each request, along with the identifier, with an index value used to iterate through each request. The data processing system can parse, process, or otherwise extract the device context information from each classification request.

In some implementations, the data processing system can transmit one or more requests for device context information to the known client devices via the network. The requests for context information can include a request for the device classification. In response to the requests, the known client devices can provide context information, device information, and the classification of the client device. The data processing system can use this information, or the information received in the requests for classification, to train one or more obfuscation models or one or more classification models. To do so, the data processing system can store the context information, the device information, and the known classification in a data structure in association with an identifier of the client device responsible for providing that information. The data processing system can access the data structures including the context information and the classification information of the known client devices to train the models, as described herein.

The data processing system can select the k-th request (ACT 404). To train the obfuscation and classification models for each of the received requests received from known client devices, the data processing system can iteratively loop through each of the received requests based on a counter register k. Each of the requests can be stored and indexed in a data structure by an index value (e.g., index 0, index 1, index 2, etc.). To process a request, the data processing system can select the request that includes an index value equal to the counter register k. If it is the first iteration of the loop, the counter register k may be initialized to an initialization value (e.g. k=0) before selecting the k-th request. Accessing the requests can include copying the data associated with the selected request to a different region of computer memory, for example a working region of memory in the data processing system.

The data processing system can extract metadata and context information from the selected request (ACT 406). The data processing system can access one or more data structures including the selected request to extract metadata and context information from the request. In some implementations, the data processing system can have the metadata and context information already stored in one or more data structures in the memory of the data processing system. If so, the data processing system can use the stored information. The data processing system can parse the selected request to extract the context information (e.g., the context information 155, etc.), and other metadata (e.g., the device information 160, etc.). The context information can include, for example, text that is displayed on the respective client device, text that is not displayed on the respective client device, search queries (e.g. including one or more keywords, terms, etc.) input to the respective client device, historical search queries (e.g. including one or more keywords, terms, etc.), client device input or interaction events (e.g., coordinates, associated application, time of interaction or input, frequency of interaction, etc.), time values associated with any of the context information described herein, time periods of usage in any application executable by the client device, applications executing or resident on the client device, metadata (e.g., keywords, content items, interaction events, historical interaction events, profile information, timestamp information, etc.) associated with applications executing or on the device, web browsing history, interaction history, facial recognition information, biometric information (e.g., fingerprints, eye color, hair color, etc.), regular periods of device use, device charging information (e.g., power levels, battery, regular charging times or seasonalities, etc.), regular periods of device non-use, communication history (e.g., text or SMS message history, call history, video call history, call information, video call information, etc.), and other information that may be used or accessed by any application or operating system executed by the respective client device. The data processing system can extract this information from the requests or from the context information received from the known client devices, and associate (e.g., store in a data structures, etc.) the context information with the respective classification of the client device. In some implementations, the data processing system can store and access the known client device context information and the known client device metadata information from a database (e.g., the database 115).

The data processing system can provide context as input to an obfuscation model (ACT 408). Providing the context as input can include formatting or structuring the device context information extracted from the request into a format that can be input into the obfuscation model. For example, this can include extracting individual values of the context or metadata information and restructuring them into an input vector with one or more coordinates. Each coordinate of the input vector can correspond to one item of context information. In some implementations, the input vector can have a predetermined order that the data processing system can populate based on what is present in the extracted context or metadata information. In some implementations, the input vector can have a predetermined number of coordinates, where each coordinate corresponds to a single value of context information. If the context information or metadata information does not include information that corresponds to a particular coordinate of the input vector, the data processing system can populate that coordinate with a placeholder value. The placeholder value can be a predetermined number, for example, zero. If the context or metadata information does include information that corresponds to a particular coordinate of the input vector, the data processing system can populate that vector with the corresponding context information or metadata.

The data processing system can compute an output vector using the input vector and the obfuscation model. Computing the output vector can include multiplying the input vector by one or more coefficients, for example in a layer of neural network (e.g., deep neural network, convolutional neural network, etc.). Computing the output vector can include multiplying the input vector through one or more layers of a neural network or machine learning model. The obfuscation model can produce an output vector with one or more coordinates, where the output vector is an obfuscated vector representing the device context. In some implementations, the output vector can be obfuscated to a degree such that the exact values of the coordinates of the input vector cannot be determined from the output vector. Accordingly, the data processing system can use the obfuscation model to produce vectors that represent in the information included in the device context without revealing the values present in the device context. This can allow the system to classify devices with protected or private information without transmitting that information in a computer network. This can improve the overall security, privacy, and network utilization of device classification computer systems.

The data processing system can use an output vector and metadata as input to a classification model (ACT 410). To determine a predicted classification of the device based on the output vector, the data processing system can use the output vector calculated using the obfuscation model as an input to a classification model (e.g., the classification model maintained and trained by the classification model trainer 140, etc.). The classification model can include one or more layers of coefficients, and can accept an obfuscation vector as an input. Using the classification model, the output vector, and metadata extracted from the classification request, the data processing system can compute a predicted device classification value. The predicted device classification value can be computed, for example, by first computing an input vector to the classification model. For example, the data processing system can concatenate the output vector of the obfuscation model with a vector generated from the metadata included in the selected request to create an input vector to the classification model.

The data processing system can train models based on output of classification model (ACT 412). The models can include, for example, the obfuscation model 185 or the classification model trained by the classification model trainer 140 of the data processing system 105. Training the models can include performing a training algorithm (e.g., supervised learning, unsupervised learning, reinforcement learning, gradient descent algorithms, etc.). The data processing system can apply the output vector and metadata as input to the classification model to receive a classification output. The data processing system can use the classification output as feedback to train the classification models and the obfuscation models. By training the models stored in memory, the data processing system can facilitate device classification of unknown (e.g., unclassified, etc.) client devices based on the classification of known client devices. Training the obfuscation and classification models based on known classifications can include adjusting the weights, biases, or parameters of the model to facilitate relevant device classification.

The data processing system can determine whether the counter register k is equal to the number of requests n (DECISION 414). To determine whether the data processing system has trained the classification and obfuscation models using each of the received classification requests, the data processing system can compare the counter register used to select each request to the total number of requests n. If the counter register k is not equal to (e.g., less than) the total number of requests n, the data processing system can execute (ACT 416). If the counter register k is equal to (e.g., equal to or greater than) the total number of requests n, the data processing system can execute (ACT 418).

The data processing system can increment the counter register k (ACT 416). To use each of the requests from known client devices as training data for the obfuscation and classification models, the data processing system can add one to the counter register k to indicate the number of processed requests. In some implementations, the data processing system can set the counter register k to a memory address value (e.g., location in computer memory) of the next location in memory of the next unprocessed request, for example in a data structure. If this is the first iteration of this loop, the data processing system can initialize the counter register k to an initial value, for example zero, before incrementing the counter register. After incrementing the value of the counter register k, the data processing system can execute (ACT 404) of the method 400

The data processing system can provide the obfuscation model to unknown (e.g., unclassified, etc.) client devices (e.g., the unknown client devices 170) (ACT 418). Providing the obfuscation model can include copying the obfuscation model (e.g., weights, biases, configuration information, computer-executable instructions, scripts, etc.) from one region of memory to another region of memory in the data processing system. Providing the classification model to unknown client devices can include transmitting the obfuscation model to the unknown devices via a network (e.g., the network 110, etc.). In some implementations, the data processing system can compress the obfuscation model using one or more compression algorithms, thereby reducing network resource utilization when transmitting the obfuscation model to many client devices. In some implementations, the data processing system can combine, package, or otherwise include the obfuscation model in one or more messages or packets, for example as part of a software distribution or another type of content package.

The data processing system can finish generating on-device classification models (ACT 420). After the obfuscation and the classification models have been trained and provided to the unknown client devices, the data processing system can finish performing the method 400. For example, the data processing system can take steps to de-allocate any memory regions provisioned to the processes or data structures described herein with respect to method 400, and may re-initialize each of the counter registers described herein to a predetermined initialization value. The predetermined initialization values can be retrieved, for example, from one or more data structures resident in the memory of the data processing system.

Figure 5:
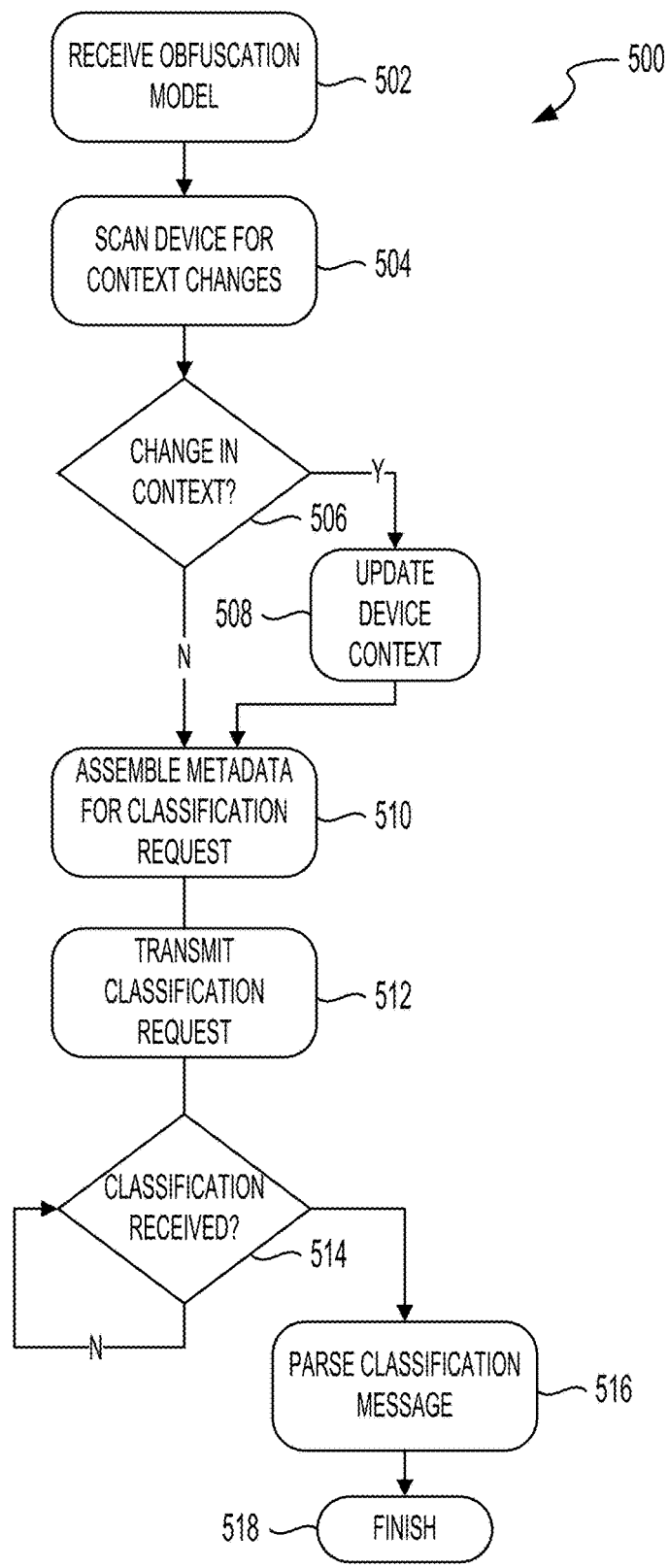
FIG. 5 shows a flow diagram of a method of securely maintaining a device context and providing classification requests without compromising device privacy.

Referring now to FIG. 5, illustrated is a flow chart of an example method 500 of securely maintaining a device context and providing classification requests without compromising device privacy. The method can be performed or otherwise executed by any computing device described herein, including the unknown client devices 170, the known client devices 120, and the computer system 600, among others. A client device (e.g., the unknown client device 170, the known client device 120, etc.) can receive an obfuscation model (ACT 502). The client device can scan the device for context changes (ACT 504). The client device can determine whether there has been a change in the device context (DECISION 506). The client device can update the device context (ACT 508). The client device can assemble metadata for a classification request (ACT 510). The client device can transmit the classification request (ACT 512). The client device can determine whether a classification has been received (DECISION 514). The client device can parse the classification message (ACT 516). The client device can finish providing a classification request (ACT 518).

The client device (e.g., the unknown client device 170, the known client device 120, etc.) can receive an obfuscation model (ACT 502). Receiving the obfuscation model can include receiving one or more network packets or messages including the obfuscation model via a computer network (e.g., the network 110). The client device can parse the messages to extract the obfuscation model. After extracting the obfuscation model, the client device can store the model in one or more data structures in the memory of the client device. The obfuscation model can be stored in the memory such that the data associated with the obfuscation model is accessible by one or more applications or operating systems executing on the client device. The applications or operating systems can use the obfuscation model to generate one or more classification requests.

The client device can scan the device for context changes (ACT 504). Scanning the client device for context changes can include determining if there is a device context currently stored on the device. For example, the client device can maintain a device context in one or more data structures in the memory of the client device. Such data structures can be organized such that only privileged or appropriate applications or operating systems can access data included in the device context. The device context can include, for example, text that is displayed on the client device, text that is not displayed on the client device, search queries (e.g. including one or more keywords, terms, etc.) input to the client device, historical search queries (e.g. including one or more keywords, terms, etc.), client device input or interaction events (e.g., coordinates, associated application, time of interaction or input, frequency of interaction, etc.), time values associated with any of the context information described herein, time periods of usage in any application executable by the client device, applications executing or resident on the client device, metadata (e.g., keywords, content items, interaction events, historical interaction events, profile information, timestamp information, etc.) associated with applications executing or on the device, web browsing history, interaction history, facial recognition information, biometric information (e.g., fingerprints, eye color, hair color, etc.), regular periods of device use, device charging information (e.g., power levels, battery, regular charging times or seasonalities, etc.), regular periods of device non-use, communication history (e.g., text or SMS message history, call history, video call history, call information, video call information, etc.), and other information that may be used or accessed by any application or operating system executed by the client device. The client device can monitor the execution of one or more applications or operating systems for a change in any of the information described herein as part of the device context. The client device can store, update, or otherwise maintain any information associated with the device context in one or more data structures in the client device. In some implementations, the client device can generate a context update signal when the device context is updated.

The client device can determine whether there has been a change in the device context (DECISION 506). The client device can determine if there was a change in the device context by monitoring for the context update signal generated by the client device. The context update signal can be generated by the client device when any information associated with the device context has been updated, instantiated, or otherwise changes by one or more applications or operating systems executing on the client device. If the client device detects a change in any information associated with the device context, or detects the context update signal generated by the client device, the client device can perform ACT 508 of the method 500. If the client device does not detect a change in the device context, the client device can perform ACT 510 of the method 500.

The client device can update the device context (ACT 508). Updating the device context can include storing, modifying, deleting, or otherwise maintaining any and all information associated with the device context as described herein in one or more data structures in the memory of the client device. Updating the device context can include storing one or more device attributes, parameters, or metadata in the data structures maintaining the device context. In some implementations, the client device can store a timestamp associated with the device context update in association with the respective device context information that is updated. In some implementations, the client device can perform a partial update of the device context when there are only minor changes. For example, if the text displayed on the client device changes, but the rest of the device context remains the same, the client device can update only the portions of the maintained device context that are associated with text currently displayed on the client device.

The client device can assemble metadata for a classification request (ACT 510). Applications or operating systems executing on the client device may assemble one or more context requests. To obfuscate the device context, the applications and operating systems executing on the client device can utilize the obfuscation model received at ACT 502 to create an output vector. The client device can include the output vector in the request. In addition to the output vector representing the device context, the client device can include additional information, such as request metadata. The request metadata can include information from the application or operating system making the request, such as application state, the time the request was made, information about the application, and other non-protected or non-private information. The metadata can include one or more variables, strings, terms, keywords, or other information that may have led to the request for the device context. The request for a device context could be associated with an interaction event detected by the client device.

The client device can transmit the classification request (ACT 512). Transmitting the classification request can include copying the assembled metadata and output vector of the obfuscation model (e.g., weights, biases, configuration information, computer-executable instructions, scripts, etc.) from one region of memory to another region of memory (e.g., a working region of memory) in the client device. Transmitting the classification request to the data processing system can include transmitting the assembled metadata and the output vector to the data processing system via a network (e.g., the network 110, etc.). In some implementations, the data processing system can compress the obfuscation model using one or more compression algorithms, thereby reducing network resource utilization when transmitting the obfuscation model to many client devices. In some implementations, the data processing system can combine, package, or otherwise include the obfuscation model in one or more messages or packets, for example as part of a software distribution or another type of content package.

The client device can determine whether a classification has been received (DECISION 514). After transmitting the request for the device context, the client device can wait until a device classification has been received. While waiting for the device classification, the client device can continue executing one or more applications on the client device. For example, an application may generate and transmit a classification request, but continue executing as normal on the client device while waiting for the device classification as a background thread or process. In some implementations, execution of the application or operating system can be suspended until the classification is received. If the client device receives a classification message from the data processing system, the client device can store the message in one or more data structures in the memory of the client device and execute ACT 516 of the method 500. If the client device has not received a classification message from the data processing system, the client device can continue waiting for the classification message at ACT 514 of the method 500.

The client device can parse the classification message (ACT 516). After receiving the classification message from the server, the client device can parse the classification message to retrieve the device classification information requested by the application or operating system. Parsing the classification message can include extracting one or more authentication keys, numbers, or codes from the classification message and storing them in a different region of memory on the client device. In some implementations, the classification message can include content, such as images, text, video, or other information associated with the device classification. In some implementations, the device classification message can include instructions to display the content included in the classification message on the client device. In some implementations, based on other instructions included in the classification message, the client device can send an additional message including the authentication key, to an external computing device for further processing. Such implementations may be used, for example, to authenticate the device for use in external systems.

The client device can finish providing a classification request (ACT 518). After the classification message has been received by the unknown client device, the client device can finish performing the method 500. For example, the client device can take steps to de-allocate any memory regions provisioned to the processes or data structures described herein with respect to method 500, and may re-initialize each of the counter registers described herein to a predetermined initialization value. The predetermined initialization values can be retrieved, for example, from one or more data structures resident in the memory of the client device.

FIG. 6 shows the general architecture of an illustrative computer system 600 that may be employed to implement any of the computer systems discussed herein in accordance with some implementations. The computer system 600 can be used to provide information via the network 110 for display. The computer system 600 of FIG. 6 comprises one or more processors 620 communicatively coupled to memory 625, one or more communications interfaces 605, and one or more output devices 610 (e.g., one or more display units) and one or more input devices 615. The processors 620 can be included in the data processing system 105.

In the computer system 600 of FIG. 6, the memory 625 may comprise any computer-readable storage media, and may store computer instructions such as processor-executable instructions for implementing the various functionalities described herein for respective systems, as well as any data relating thereto, generated thereby, or received via the communications interface(s) or input device(s) (if present). Referring again to the system 600 of FIG. 6, the data processing system 105 can include the memory 625 to store information related to the sets of user identifiers, the generated vectors, among others. The processor(s) 620 shown in FIG. 6 may be used to execute instructions stored in the memory 625 and, in so doing, also may read from or write to the memory various information processed and or generated pursuant to execution of the instructions.

The processor 620 of the computer system 600 shown in FIG. 6 also may be communicatively coupled to or control the communications interface(s) 605 to transmit or receive various information pursuant to execution of instructions. For example, the communications interface(s) 605 may be coupled to a wired or wireless network, bus, or other communication means and may therefore allow the computer system 600 to transmit information to or receive information from other devices (e.g., other computer systems). While not shown explicitly in the system of FIG. 6, one or more communications interfaces facilitate information flow between the components of the system 600. In some implementations, the communications interface(s) may be configured (e.g., via various hardware components or software components) to provide a website as an access portal to at least some aspects of the computer system 600. Examples of communications interfaces 605 include user interfaces (e.g., web pages), through which the user can communicate with the computer system 600.

The output devices 610 of the computer system 600 shown in FIG. 6 may be provided, for example, to allow various information to be viewed or otherwise perceived in connection with execution of the instructions. The input device(s) 615 may be provided, for example, to allow a user to make manual adjustments, make selections, enter data, or interact in any of a variety of manners with the processor during execution of the instructions. Additional information relating to a general computer system architecture that may be employed for various systems discussed herein is provided further herein.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more components of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The features disclosed herein may be implemented on a smart television module (or connected television module, hybrid television module, etc.), which may include a processing module configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

The operations described in this specification can be implemented as operations performed by a data processing apparatus on data stored on one or more computer-readable storage devices or received from other sources.

The terms "data processing apparatus", "data processing system", "user device", "client device", or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system such as the data processing system 105 can include clients and servers. For example, the data processing system 105 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the data processing system 105 could be a single module, a logic device having one or more processing modules, one or more servers, or part of a search engine.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided herein relate to controlling the display of content of information resources, the systems and methods described herein can include applied to other environments. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method of generating on-device classification models to improve security, privacy, and network resource utilization, comprising:
   maintaining, by one or more processors and a memory, in a database, a plurality of data records associated with a respective plurality of client devices, each of the data records including an identifier of a request and a known classification value, wherein the request includes client device context information and client device metadata;
   training, by the one or more processors, using each of the plurality of requests and known classification values, a context obfuscation model, the context obfuscation model configured to receive, as input, client device context information, and provide, as output, an output classification vector;
   training, by the one or more processors, using each of the plurality of requests and known classification values, a classification model configured to receive, as input, a classification vector and a metadata input, and provide, as output, a device classification value;
   transmitting, by the one or more processors, the context obfuscation model to a plurality of second client devices to obfuscate the context information of each of the plurality of client devices;
   receiving, by the one or more processors, a request for classification, the request including (1) a classification vector created as an output of the context obfuscation model executed by the client device and (2) request metadata;
   determining, by the one or more processors, using the classification vector received in the request for classification and the request metadata as inputs to the classification model, a device classification; and
   transmitting, by the one or more processors, the device classification to the device responsible for the request for classification.

2. The method of claim 1, further comprising:
   generating, by the one or more processors responsive to determining the classification of the client device, a classification data record, the classification data record including an indication of the request for classification and the device classification,
   storing, by the one or more processors, the classification data record in the database in association with the device associated with the request for classification.

3. The method of claim 1, further comprising:
   updating, by the one or more processors, the context obfuscation model using at least the determined device classification to create an updated context obfuscation model; and
   transmitting, by the one or more processors, the updated context obfuscation model to each of the plurality of second client devices.

4. The method of claim 3, further comprising:
   updating, by the one or more processors, the classification model using the determined device classification and the updated context obfuscation model to create an updated classification model.

5. The method of claim 1, further comprising:
   receiving, by the one or more processors, the plurality of requests and known classification values, the plurality of requests and the plurality of known classification each associated with the respective plurality of client devices;
   generating, by the one or more processors, the plurality of data records, each of the data records including the indication of the respective request of the plurality of requests and the respective known classification value of the plurality of known classification values; and
   storing, by the one or more processors, in the database, the plurality of data records in association with the respective plurality of client devices.

6. The method of claim 1, wherein training the classification model and training the context obfuscation model further comprises:
   training, by the one or more processors, using each of the plurality of requests and known classification values, a combined model, the combined model configured to receive, as input, the client device context information and the metadata input, and provide, as output the device classification value;
   extracting, by the one or more processors, from the combined model, the context obfuscation model to generate the context obfuscation model; and
   extracting, by the one or more processors, from the combined model, the classification model to generate the classification model.

7. The method of claim 1, further comprising:
   normalizing, by the one or more processors, the request metadata to create a normalized metadata vector; and determining, by the one or more processors, using the classification vector received in the request for classification and the normalized metadata vector as inputs to the classification model, the device classification.

8. The method of claim 1, further comprising:
authenticating, by the one or more processors, the device classification value to determine that the device responsible for the request for classification can access protected content; and
providing, by the one or more processors, access to the protected content to the device responsible for the request for classification responsive to determining that the device responsible for the request for classification can access the protected content.

9. The method of claim 8, further comprising:
determining, by the one or more processors, a likelihood that the device responsible for the request for classification will view the protected content using the classification model.

10. The method of claim 1, wherein the request for classification indicates an actuation of a uniform resource identifier on the client device responsible for the request for classification.

11. A system for generating on-device classification models to improve security, privacy, and network resource utilization, comprising:
one or more processors and a memory, the one or more processors configured to:
maintain, in a database, a plurality of data records associated with a respective plurality of client devices, each of the data records including an identifier of a request and a known classification value, wherein the request includes client device context information and client device metadata;
train, using each of the plurality of requests and known classification values, a context obfuscation model, the context obfuscation model configured to receive, as input, client device context information, and provide, as output, an output classification vector;
train, using each of the plurality of requests and known classification values, a classification model configured to receive, as input, a classification vector and a metadata input, and provide, as output, a device classification value;
transmit the context obfuscation model to a plurality of second client devices to obfuscate the context information of each of the plurality of client devices;
receive a request for classification, the request including (1) a classification vector created as an output of the context obfuscation model executed by the client device and (2) request metadata;
determine using the classification vector received in the request for classification and the request metadata as inputs to the classification model, a device classification; and
transmit the device classification to the device responsible for the request for classification.

12. The system of claim 11, wherein the one or more processors are further configured to:
generate, responsive to determining the classification of the client device, a classification data record, the classification data record including an indication of the request for classification and the device classification; and
store the classification data record in the database in association with the device associated with the request for classification.

13. The system of claim 11, wherein the one or more processors are further configured to:
update the context obfuscation model using at least the determined device classification to create an updated context obfuscation model; and
transmit the updated context obfuscation model to each of the plurality of second client devices.

14. The system of claim 13, wherein the one or more processors are further configured to:
update the classification model using the updated device classification and the determined context obfuscation model to create an updated classification model.

15. The system of claim 11, wherein the one or more processors are further configured to:
receive the plurality of requests and known classification values, the plurality of requests and the plurality of known classification each associated with the respective plurality of client devices;
generate the plurality of data records, each of the data records including the indication of the respective request of the plurality of requests and the respective known classification value of the plurality of known classification values; and
store, in the database, the plurality of data records in association with the respective plurality of client devices.

16. The system of claim 11, wherein in training the classification model and in training the context obfuscation model, the one or more processors are further configured to:
train, using each of the plurality of requests and known classification values, a combined model, the combined model configured to receive, as input, the client device context information and the metadata input, and provide, as output the device classification value;
extract, from the combined model, the context obfuscation model to generate the context obfuscation model; and
extract, from the combined model, the classification model to generate the classification model.

17. The system of claim 11, wherein the one or more processors are further configured to:
normalize the request metadata to create a normalized metadata vector; and
determine, using the classification vector received in the request for classification and the normalized metadata vector as inputs to the classification model, the device classification.

18. The system of claim 11, wherein the one or more processors are further configured to:
authenticate the device classification value to determine that the device responsible for the request for classification can access protected content; and
provide access to the protected content to the device responsible for the request for classification responsive to determining that the device responsible for the request for classification can access the protected content.

19. The system of claim 11, wherein the one or more processors are further configured to determine a likelihood that the device responsible for the request for classification will view the protected content using the classification model.

20. The system of claim 11, wherein the request for classification indicates an actuation of a uniform resource identifier on the client device responsible for the request for classification.

* * * * *